United States Patent
Loganadane et al.

(10) Patent No.: US 10,212,163 B1
(45) Date of Patent: Feb. 19, 2019

(54) METHOD AND APPARATUS FOR SIMPLIFIED AND SECURED HOTSPOT DEVICE CONNECTIVITY

(71) Applicant: MBIT WIRELESS, INC., Irvine, CA (US)

(72) Inventors: Nithilane Loganadane, Puducherry (IN); Prakash Neelakandan Malliga, Chennai (IN); Kalyankumar Reddy, Kadapa (IN); Ilavarasan Kuppan, Puducherry (IN); Pravinkumar Muralidaran, Villupuram (IN); Siva Munirathinam, Thiruvallur (IN)

(73) Assignee: MBIT WIRELESS, INC., Irvine, CA (US)

(*) Notice: Subject to any disclaimer, the term of this patent is extended or adjusted under 35 U.S.C. 154(b) by 402 days.

(21) Appl. No.: 15/051,879

(22) Filed: Feb. 24, 2016

(51) Int. Cl.
| | |
|---|---|
| G06F 7/04 | (2006.01) |
| H04L 29/06 | (2006.01) |
| H04W 12/06 | (2009.01) |
| H04W 48/02 | (2009.01) |
| H04W 76/10 | (2018.01) |
| H04W 84/12 | (2009.01) |

(52) U.S. Cl.
CPC .......... *H04L 63/10* (2013.01); *H04L 63/0227* (2013.01); *H04L 63/08* (2013.01); *H04W 12/06* (2013.01); *H04W 48/02* (2013.01); *H04W 76/10* (2018.02); *H04W 84/12* (2013.01)

(58) Field of Classification Search
CPC ..... H04W 88/04; H04W 16/14; H04W 24/02; H04W 72/0453; H04W 72/1231; H04W 80/06; H04W 84/22; H04W 88/06; H04W 92/02; H04W 12/06; H04W 84/12; H04W 76/11; H04W 12/08; H04W 4/80; H04W 76/14; H04W 8/18; H04L 47/125; H04L 47/24; H04L 69/14; H04L 61/6022; H04L 63/0272; H04L 63/08; H04L 63/083; H04L 63/0876; H04L 63/102; H04B 11/00
See application file for complete search history.

(56) References Cited

U.S. PATENT DOCUMENTS

| | | | |
|---|---|---|---|
| 2016/0007265 A1* | 1/2016 | Xiu | H04W 48/20 370/235 |
| 2016/0219589 A1* | 7/2016 | Khawer | H04W 72/0453 |
| 2016/0378081 A1* | 12/2016 | Della Corte | G05B 15/02 700/275 |

* cited by examiner

*Primary Examiner* — Abiy Getachew
(74) *Attorney, Agent, or Firm* — Lerner, David, Littenberg, Krumholz & Mentlik, LLP

(57) ABSTRACT

To provide increased security in Wi-Fi enabled client devices, Media Access Control (MAC) address of a client device may have to be entered manually in a hotspot device which may increase complexity. A method and apparatus are disclosed in which a first client device, referred as Admin client device, may be authenticated by provisioning the MAC address of the client device in a hotspot device. When a new client device is connected with hotspot device, the hotspot device may send MAC address of the new client device to Admin client device. The Admin client device may prompt the device authentication request with MAC address of a new client device. If the user authenticates the request, MAC address of the new client device may be authenticated and internet access may be provided to the new client device. With this method, connection establishment of new client devices is simplified with increased security.

17 Claims, 9 Drawing Sheets

METHOD AND APPARATUS FOR SIMPLIFIED AND SECURED HOTSPOT DEVICE CONNECTIVITY

BACKGROUND

Typically, in order to connect multiple client devices wirelessly and to form Wireless Local Area Network (WLAN), the Institute of Electrical and Electronics Engineers (IEEE) standard 802.11 based protocol may be used. This protocol is more commonly known as Wi-Fi. However, since the user data is transmitted wirelessly, it may be susceptible to interception by any anonymous device which can retrieve user data. To overcome this vulnerability, device authentication and data encryption mechanisms are provided by Wi-Fi security standards.

A hotspot device as defined herein is a router or a gateway that may provide wireless internet access to multiple client devices at the same time over a WLAN. As illustrated in FIG. 1 the source of internet service for a hotspot device may be a traditional internet service such as Digital Subscriber Line (DSL), Cable modem, T1 line, fibre optic cable, etc. A hotspot device may also be referred to as an Access Point (AP) and these two terms may be used interchangeably herein.

A mobile hotspot device as defined herein and illustrated in FIG. 2 is a portable router or a gateway that may use mobile broadband service from cellular networks to provide wireless internet access to multiple client devices at the same time over a WLAN.

Wi-Fi security standards require a password to authenticate a client device connection with a hotspot device. An end user may have to provide the network password every time a new client device is connected to a Wi-Fi network.

Wi-Fi Protected Setup (WPS) is a network security standard that enables an end user to easily provide a secure access to a wireless network. WPS also makes it easier to add new devices to a wireless network. With WPS, there is no need for a user to enter the network password. If the WPS feature is available in both the hotspot device and a client device, then the client device may be connected to the Wi-Fi network without password by enabling WPS in the hotspot device first and then enabling WPS in a client device. With this method, the Wi-Fi network name known as Service Set Identifier (SSID) and the security standard of the Wi-Fi network are configured automatically in a client device and in a hotspot device. This makes the process of configuring a network for a client device easier for an end user.

A Media Access Control (MAC) address is a unique identifier assigned to devices on a network. MAC addresses are used as a network address for most IEEE 802 series standards based network technologies, including Ethernet and Wi-Fi. In order to further increase the security, MAC address filtering may be enabled in a hotspot device. Without MAC address filtering, any wireless client device may join a Wi-Fi network if the Wi-Fi SSID of the network and network password are known. To support MAC address filtering, a hotspot device may maintain two lists namely "Authenticate list" and "Block list." The Authenticate list may contain a list of MAC addresses of client devices to which the hotspot device may grant access. The Block list may contain a list of MAC addresses of client devices to which the hotspot device may block from accessing the network.

Once the MAC address filtering is enabled, whenever a hotspot device receives a request from a client device to join the network, it compares the MAC address of that client device against the Authenticate list. With this method, only client devices with MAC addresses registered in the Authenticate list may be connected to a hotspot device. To use the MAC address filtering method to authenticate a client device, an end user may have to find the MAC address of a client device and add it to the Authenticate list. However, this increases the complexity of operation for the end user who has to add a new client device to a wireless network.

SUMMARY

The present disclosure describes a method and apparatus for simplified device authentication and connection establishment between a client device and a hotspot device when MAC address based filtering is enabled.

In accordance with an aspect of the present disclosure, a method may establish a wireless local area network (WLAN) connection between a hotspot device and a client device. The method may include controlling, by a processing device of the hotspot device, when (i) a Wi-Fi Protected Setup (WPS) is enabled at each of the hotspot device and the client device, (ii) the hotspot device has a Wi-Fi connection with an administrative client device over a Wi-Fi network; (iii) a hotspot configuration software (HCS) of the administrative client device has a socket connection with the hotspot device over the Wi-Fi network, and (iv) the client device is configured with a Service Set Identifier (SSID) and security standard of the Wi-Fi network, establishing a Wi-Fi connection with restricted network access between the hotspot device and the client device, in which the Wi-Fi connection with restricted network access between the hotspot device and the client device is established based on whether the client device is authenticated based on a Media Access Control (MAC) address of the client device.

In one alternative, the hotspot device may be configured, and status of the hotspot device may be accessible, by the HCS of the administrative client device.

In one alternative, the method may include controlling, by the processing device, when the Wi-Fi connection with the restricted network access is established between the hotspot device and the client device, transmitting from the hotspot device to the administrative client device, via the socket connection, a connection notification message including the MAC address and device name of the client device; receiving at the hotspot device from the administrative client device, via the socket connection, a device authentication message; updating MAC address information according to the device authentication message; and changing a first Wi-Fi connection state in which the Wi-Fi connection with the restricted access is established between the hotspot device and the client device, to a second Wi-Fi connection state, according to the device authentication message.

In one alternative, when the device authentication message indicates the client device is authenticated, the second Wi-Fi connection state may be a Wi-Fi connection with full network access is established between the hotspot device and the client device.

In one alternative, when the device authentication message indicates the client device is not authenticated, the second Wi-Fi connection state may be absence of a Wi-Fi connection between the hotspot device and the client device.

In one alternative, the device authentication message may be based on a user operation at the administrative client device to indicate whether the client device is authenticated.

In one alternative, the user operation may be to a display caused to be displayed by the HCS and indicating the connection request with the name and the MAC address of the client device.

In one alternative, the user operation may be to a portion on the display for indicating whether the client device is to be authenticated. In one alternative, the updating of the MAC address information may add the MAC address to a Block List, when the device authentication message indicates the client device is not authenticated, and add the MAC address to an Authenticate List, when the device authentication message indicates the client device is authenticated.

In one alternative, the method may include controlling, by the processing device, transmitting a device authentication response message from the hotspot device to the administrative client device, via the socket connection, after the updating of the MAC address information. In one alternative, the hotspot device may be a non-portable hotspot device configured to use internet broadband service to provide wireless internet access over the Wi-Fi network at a same time to a plurality of client devices.

In one alternative, when the hotspot device is a non-mobile hotspot or provisioning of the hotspot device as a mobile hotspot device is not controlled by a mobile broadband network, a second client device having a Wi-Fi connection established with the hotspot device over the Wi-Fi network may be manually authenticatable to serve as the administrative client device.

In accordance with an aspect of the present disclosure, an apparatus may be for establishing a wireless local area network (WLAN) connection between a hotspot device and a client device. The apparatus may include circuitry configured to control, when (i) a Wi-Fi Protected Setup (WPS) is enabled at each of the hotspot device and the client device, (ii) the hotspot device has a Wi-Fi connection with an administrative client device over a Wi-Fi network; (iii) a hotspot configuration software (HCS) of the administrative client device has a socket connection with the hotspot device over the Wi-Fi network, and (iv) the client device is configured with a Service Set Identifier (SSID) and security standard of the Wi-Fi network, establishing a Wi-Fi connection with restricted network access between the hotspot device and the client device, in which the Wi-Fi connection with restricted network access between the hotspot device and the client device is established based on whether the client device is authenticated based on a Media Access Control (MAC) address of the client device.

In one alternative of the apparatus, the hotspot device may be configured, and status of the hotspot device may be accessible, by the HCS of the administrative client device.

In one alternative of the apparatus, the circuitry may be configured to control, when the Wi-Fi connection with the restricted network access is established between the hotspot device and the client device, transmitting from the hotspot device to the administrative client device, via the socket connection, a connection notification message including the MAC address and device name of the client device; receiving at the hotspot device from the administrative client device, via the socket connection, a device authentication message; updating MAC address information according to the device authentication message; and changing a first Wi-Fi connection state in which the Wi-Fi connection with the restricted access is established between the hotspot device and the client device, to a second Wi-Fi connection state, according to the device authentication message.

In one alternative of the apparatus, when the device authentication message indicates the client device is authenticated, the second Wi-Fi connection state may be a Wi-Fi connection with full network access is established between the hotspot device and the client device.

In one alternative of the apparatus, when the device authentication message indicates the client device is not authenticated, the second Wi-Fi connection state may be absence of a Wi-Fi connection between the hotspot device and the client device.

In one alternative of the apparatus, the device authentication message may be based on a user operation at the administrative client device to indicate whether the client device is authenticated.

In one alternative of the apparatus, the updating of the MAC address information may add the MAC address to a Block List, when the device authentication message indicates the client device is not authenticated, and add the MAC address to an Authenticate List, when the device authentication message indicates the client device is authenticated.

In one alternative of the apparatus, the circuitry may be configured to control transmitting a device authentication response message from the hotspot device to the administrative client device, via the socket connection, after the updating of the MAC address information.

In accordance with an aspect of the present disclosure, a wireless communication device may include a receiver for receiving a signal; and a processing device for establishing a wireless local area network (WLAN) connection between a hotspot device and a client device. The processing device maybe configured to control, when (i) a Wi-Fi Protected Setup (WPS) is enabled at each of the hotspot device and the client device, (ii) the hotspot device has a Wi-Fi connection with an administrative client device over a Wi-Fi network; (iii) a hotspot configuration software (HCS) of the administrative client device has a socket connection with the hotspot device over the Wi-Fi network, and (iv) the client device is configured with a Service Set Identifier (SSID) and security standard of the Wi-Fi network, establishing a Wi-Fi connection with restricted network access between the hotspot device and the client device, in which the Wi-Fi connection with restricted network access between the hotspot device and the client device is established based on whether the client device is authenticated based on a Media Access Control (MAC) address of the client device.

DETAILED DESCRIPTION

Figure 1:
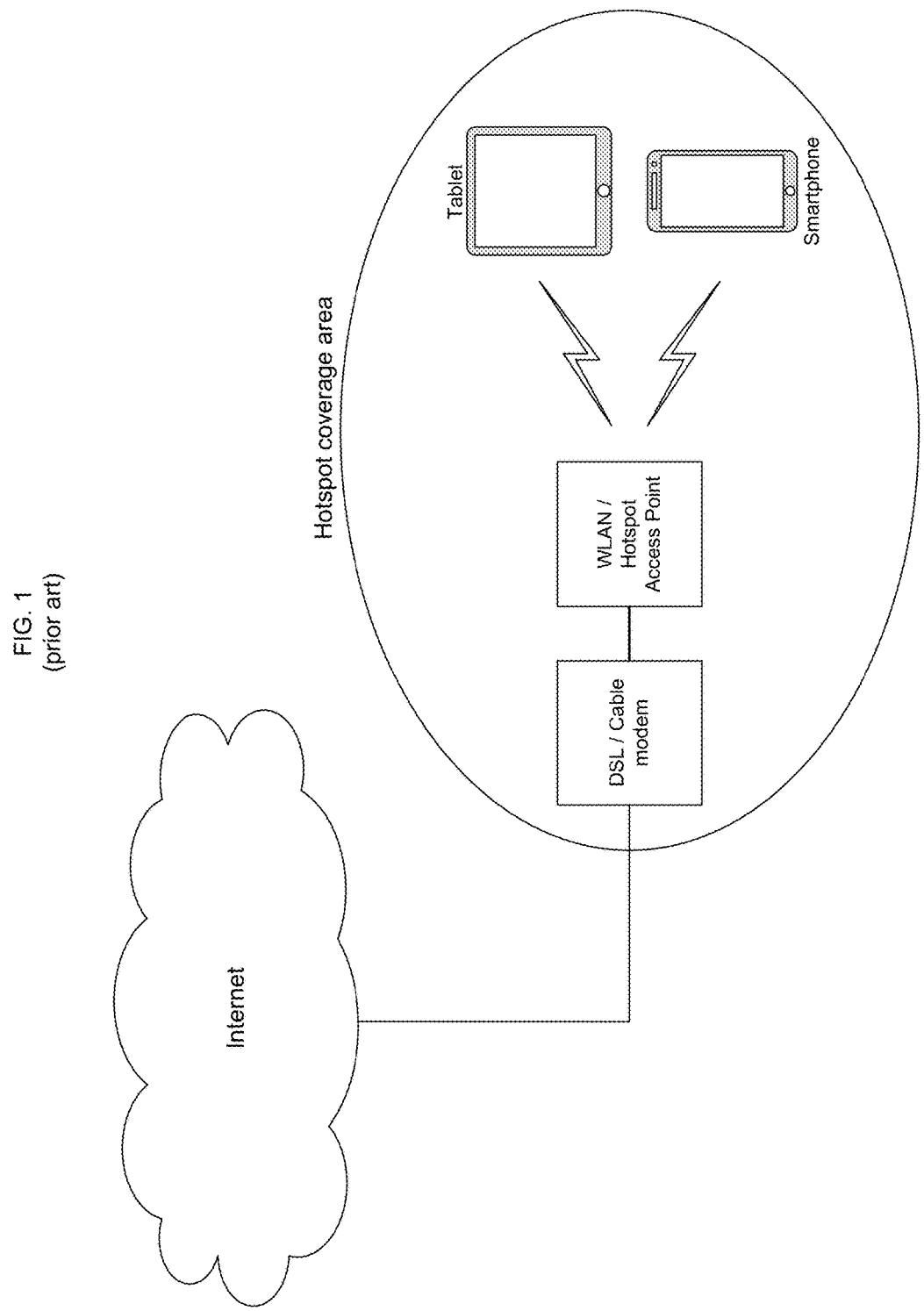
FIG. 1 illustrates an example scenario of internet access using a WLAN network over a traditional wire-line internet service.
Figure 2:
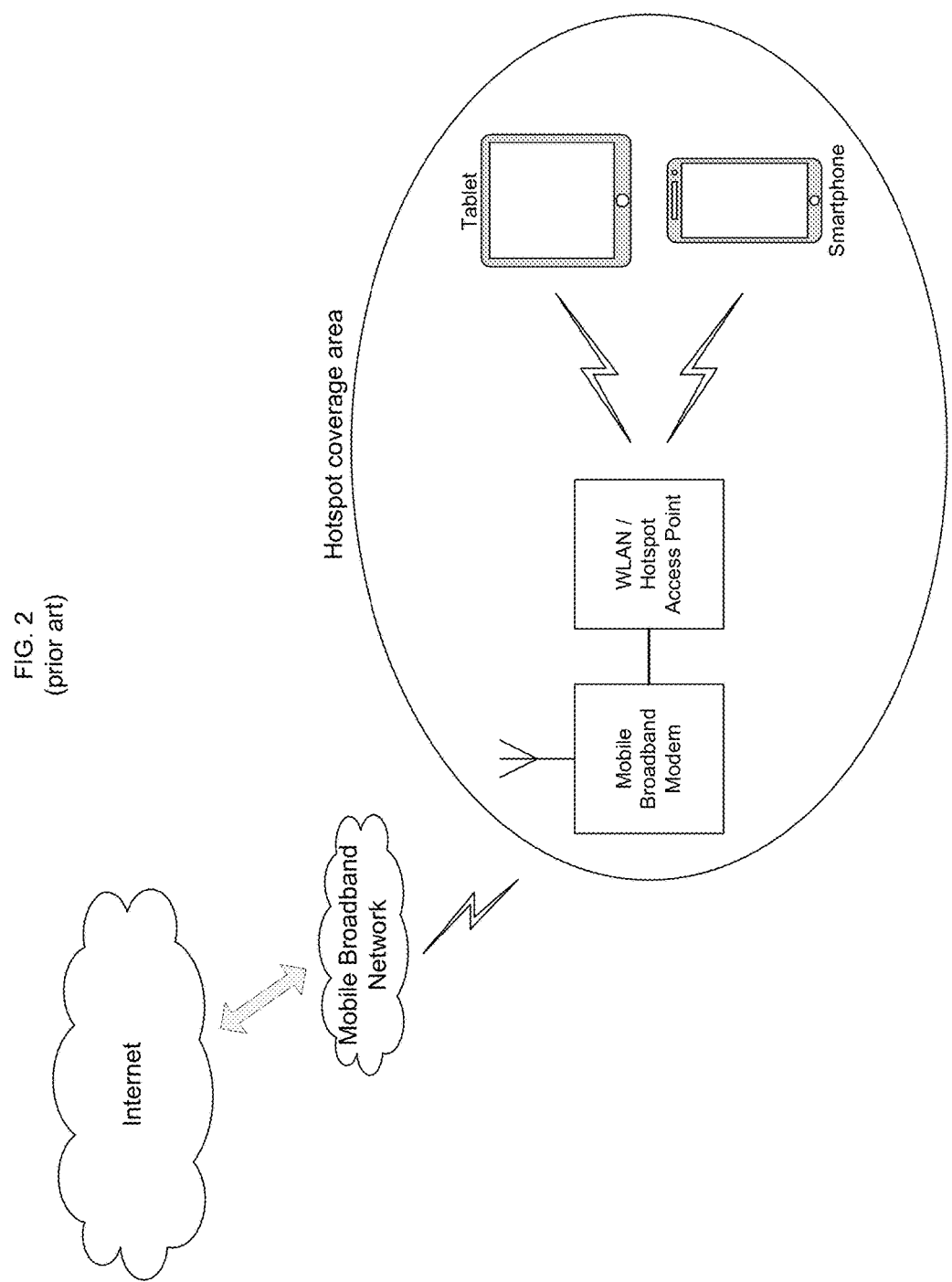
FIG. 2 illustrates an example scenario of internet access using a WLAN network over a mobile broadband network.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

A socket interface is an Application Programming Interface (API) that enables an application program to configure and use network resources. A network socket is an endpoint of an inter-process communication across a computer network. An application may interact with a hotspot device via socket interface to obtain the current status of the hotspot device and to configure the hotspot device.

According to an aspect of the present disclosure, the Wi-Fi Protected Setup (WPS) feature of Wi-Fi client devices and Media Access Control (MAC) address may be used to provide simplified and secure Wi-Fi connection without the need for the end user to enter the MAC address of the client device to be connected.

Figure 3:
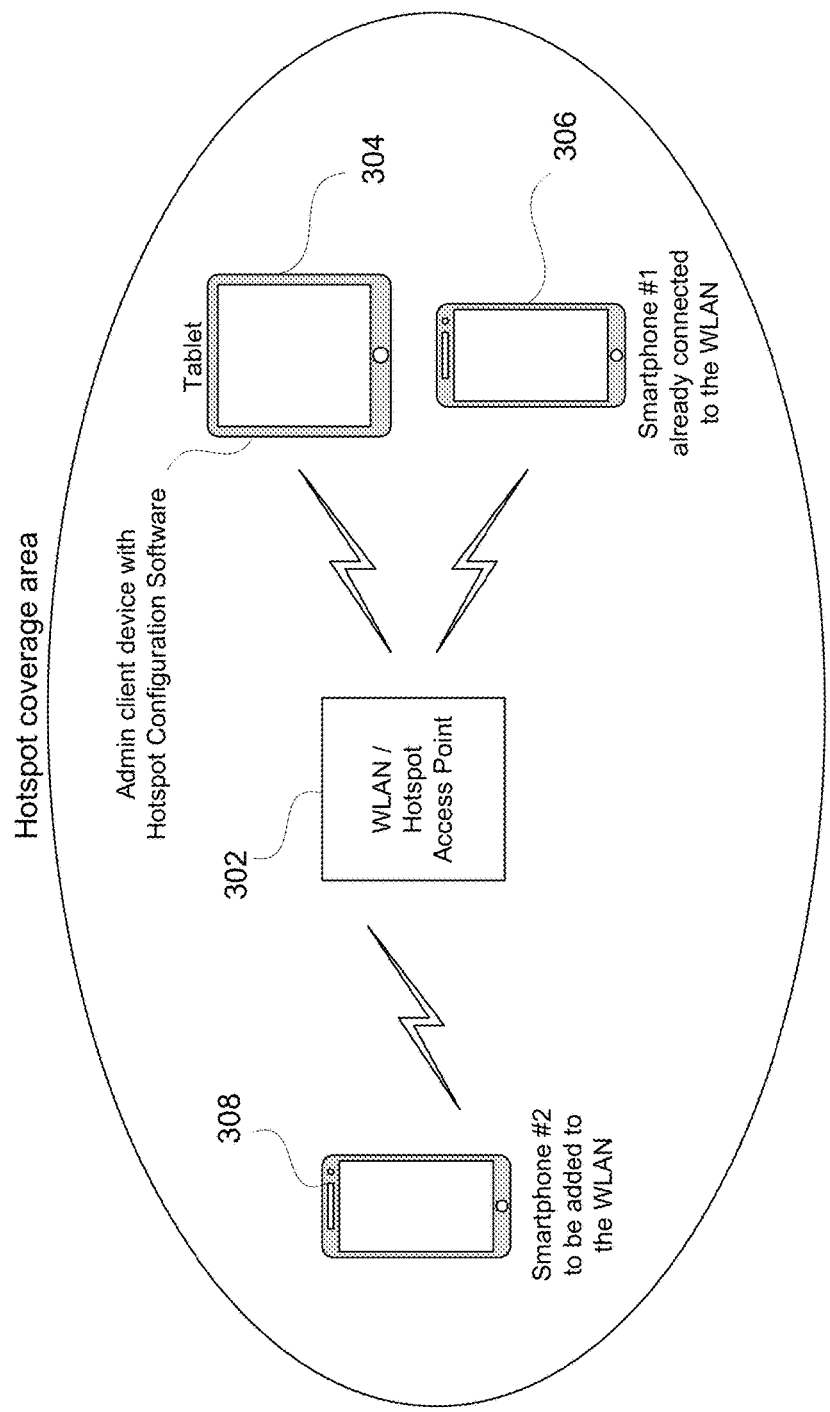
FIG. 3 illustrates an example scenario of internet access using a WLAN network when a new client device needs to be added in the presence of an Admin client device.

As illustrated in FIG. 3, one of the client devices is designated as an "Admin client device." According to an aspect of the present disclosure, application software may be installed in Admin client device to obtain the current status of a hotspot device and to configure the hotspot device. This application software is referred herein as Hotspot Configuration Software (HCS). The Admin client device with HCS may access and modify all the configurations of a hotspot device.

Provisioning refers to a set of configurations performed to a client device to make it ready for access to data services. Over the Air Device Management (OTADM) is a protocol which may enable service providers to remotely manage device settings and distribute new software updates to cell phones, hotspot devices, set-top boxes, etc. With OTADM, configuration settings may be provisioned to a mobile hotspot device over the air.

Figure 4:
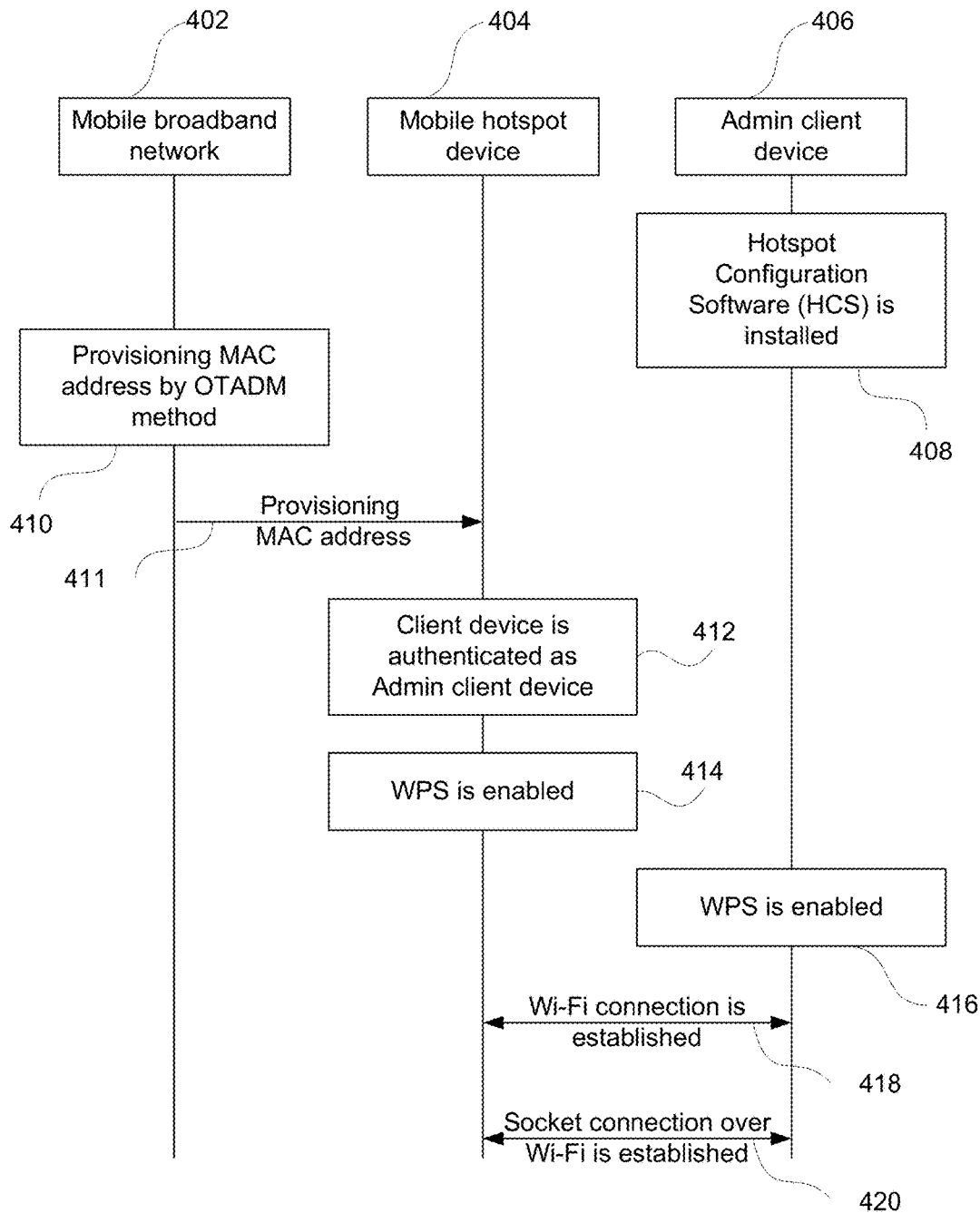
FIG. 4 illustrates an example scenario for provisioning an Admin client device with Media Access Control (MAC) address.

FIG. 4 illustrates the provisioning by OTADM method. In FIG. 4 interactions amongst three entities are shown. The block 402 corresponds to a mobile broadband network. The block 404 corresponds to a mobile hotspot device. The block 406 corresponds to the Admin client device. The block 408 corresponds to the installation of HCS in a client device designated to be the Admin client device. In processing block 410, provisioning of the Admin client device through OTADM is initiated by the mobile broadband network. At processing step 411, the mobile hotspot device is provisioned with MAC address of a client device designated to be the Admin client device by the mobile broadband network over the wireless link. At processing step 412, the client device with the MAC address provisioned in the mobile hotspot device is authenticated as an Admin client device by the mobile hotspot device. At processing step 414, WPS is enabled by the mobile hotspot device. At processing step 416, WPS is enabled in the Admin client device. The Wi-Fi network name known as Service Set Identifier (SSID) and the security standard of the Wi-Fi network are configured automatically in the Admin client device. At processing step 418, a secured Wi-Fi connection is established between the mobile hotspot device and Admin client device. At processing step 420, socket connection over Wi-Fi is established by the HCS in the Admin client device with the mobile hotspot device. This enables the Admin client device to manage the addition or removal of other client devices.

Figure 5:
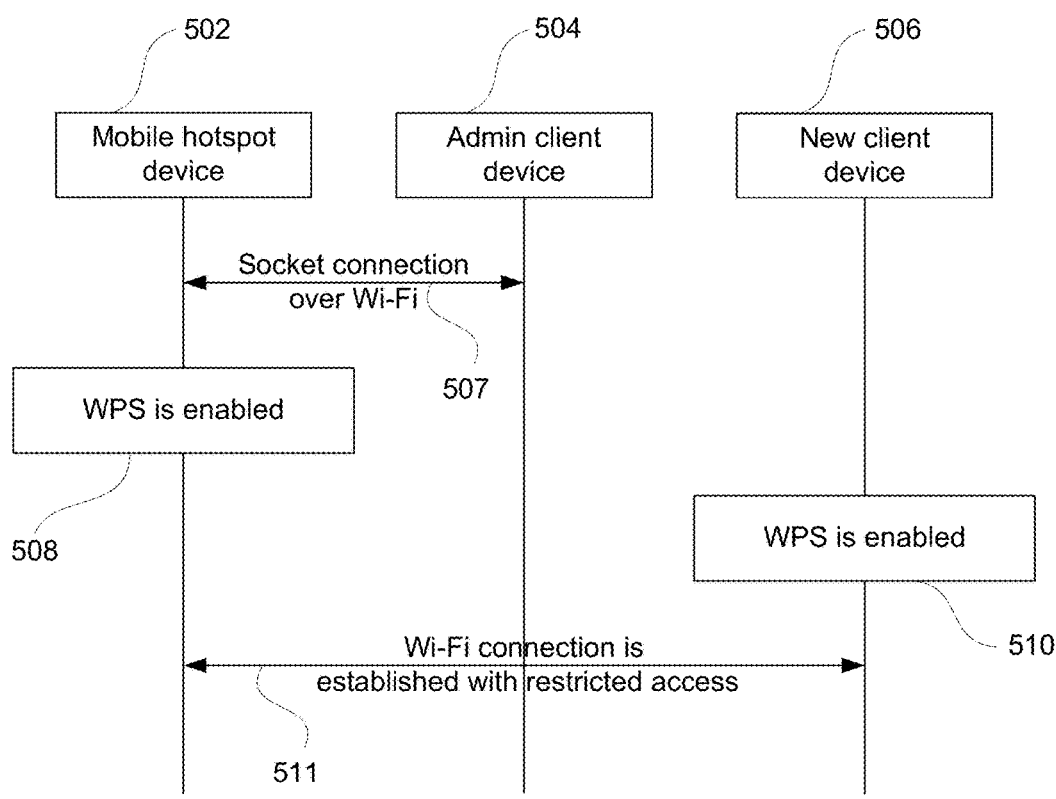
FIG. 5 illustrates an example scenario for connection establishment of a new client device using a Wi-Fi Protected Setup (WPS) method with restricted access according to the aspects of the present disclosure.

FIG. 5 illustrates the procedure to add a new client device to a WLAN with restricted access using a WPS based security protocol according to an aspect of the present disclosure. In FIG. 5 interactions amongst three entities are shown. The block 502 corresponds to a mobile hotspot device. The block 504 corresponds to the Admin client device. The block 506 corresponds to the new client device. As part of baseline initial conditions, the Admin client device already has a Wi-Fi connection with the mobile hotspot device and the HCS in the Admin client device has a socket connection with the mobile hotspot device for status and configuration purposes. This is illustrated by the link 507 between the mobile hotspot device and the Admin client device.

To connect a new client device, WPS is enabled in a mobile hotspot device at processing step 508. At processing step 510, WPS is enabled in new client device. The Wi-Fi SSID of the network and the security standard of the Wi-Fi network are configured automatically in the new client device and Wi-Fi connection is established with restricted network access between the mobile hotspot device and the new client device as illustrated by link 511. The access is restricted because the MAC address based authentication is not yet established.

Figure 6:
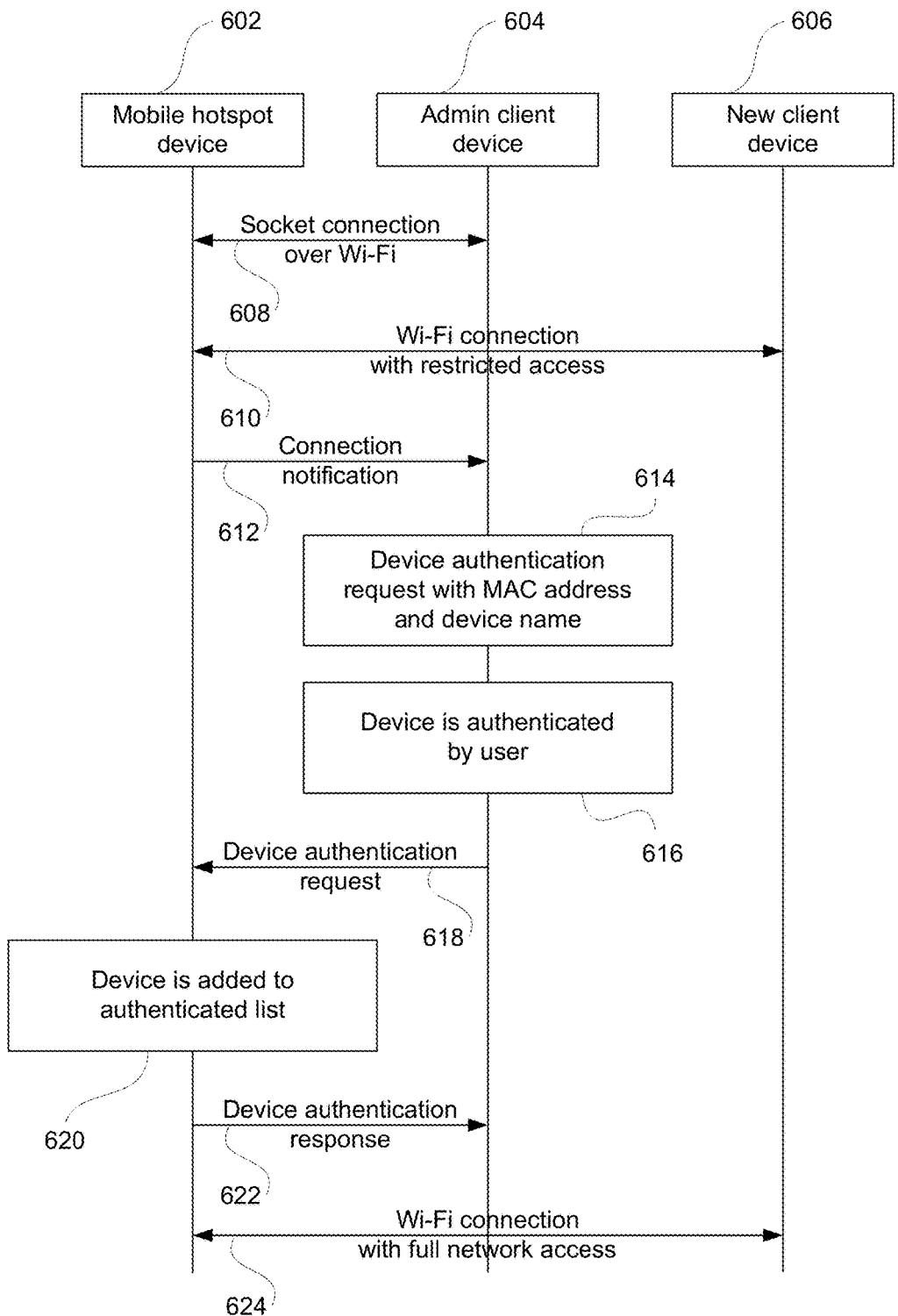
FIG. 6 illustrates an example scenario for enabling full unrestricted internet access for a new client device according to the aspects of the present disclosure.

According to the aspects of the present disclosure FIG. 6 illustrates the procedure for authenticating a new device based on MAC address filtering. In FIG. 6 interactions amongst three entities are shown. The block 602 corresponds to the mobile hotspot device. The block 604 corresponds to the Admin client device. The block 606 corresponds to the new client device. As part of baseline initial conditions, the Admin client device already has a Wi-Fi connection with the mobile hotspot device and the HCS in the Admin client device has a socket connection with the mobile hotspot device for status and configuration purposes. This is illustrated by the link 608 between the mobile hotspot device and the Admin client device. Similarly, as part of baseline initial conditions, the new client device already has a Wi-Fi connection with the mobile hotspot device with restricted access. This is illustrated by the link 610 between the mobile hotspot device and the new client device.

According to the aspects of present disclosure, when Wi-Fi connection with restricted access 610 is established between a mobile hotspot device and a new client device, the mobile hotspot device may send a Connection notification message 612 containing the MAC address and the device name of the new client device to Admin client device via socket interface.

According to the aspects of present disclosure, as illustrated in processing block 614, when the notification is received, the HCS displays the connection request of the new client device with its name and MAC address. The HCS may also display an option to authorize or decline the new client device connection request. At processing stage 616, the Admin client device user makes the decision about whether to allow further access to the new client device or not. After the user has made the choice, the HCS prepares the message 618 and sends it to the mobile hotspot device using the socket interface. At processing stage 620, the mobile hotspot receives the message 618 and determines whether to authenticate or decline access to the new client device. If the Admin device user of the Admin client device, at processing step 616, had selected to decline access, the MAC address of the new client address may be added to the Block list by the mobile hotspot device. If the Admin device user of the Admin client device, at processing step 616, had selected to authenticate the new client device, the MAC address of the new client address may be added to the Authenticate list by the mobile hotspot device. After updating the MAC address list according to the Admin client device user's choice, the mobile hotspot device may send a Device authentication response message 622 to Admin client device. Finally, the mobile hotspot device provides full access to the new client device as illustrated by link 624.

According to an aspect of the present disclosure, if the new client device is blocked by the Admin device user, then the mobile hotspot device may disconnect the Wi-Fi connection with the new client device. This method enables the end user to add new client devices to Wi-Fi network with ease while enabling MAC address filtering based security.

According to the aspects of the present disclosure, in case a hotspot device is not a mobile hotspot or the provisioning of a mobile hotspot device is not controlled by the mobile broadband network, an end user may designate one of the already connected client devices as Admin client device which may be authenticated manually as Admin client device. The HCS may be installed on the Admin client device. All the aspects of the present disclosure may be applicable to a non-portable hotspot device that may use internet broadband service from Digital Subscriber Line (DSL) or T1 line or fibre optic cable, etc. to provide wireless internet access to multiple client devices at the same time over a WLAN.

By way of example only, the above-described method may be implemented in a client device such as a tablet 304 and hotspot device 302 as shown in FIG. 3.

Figure 7:
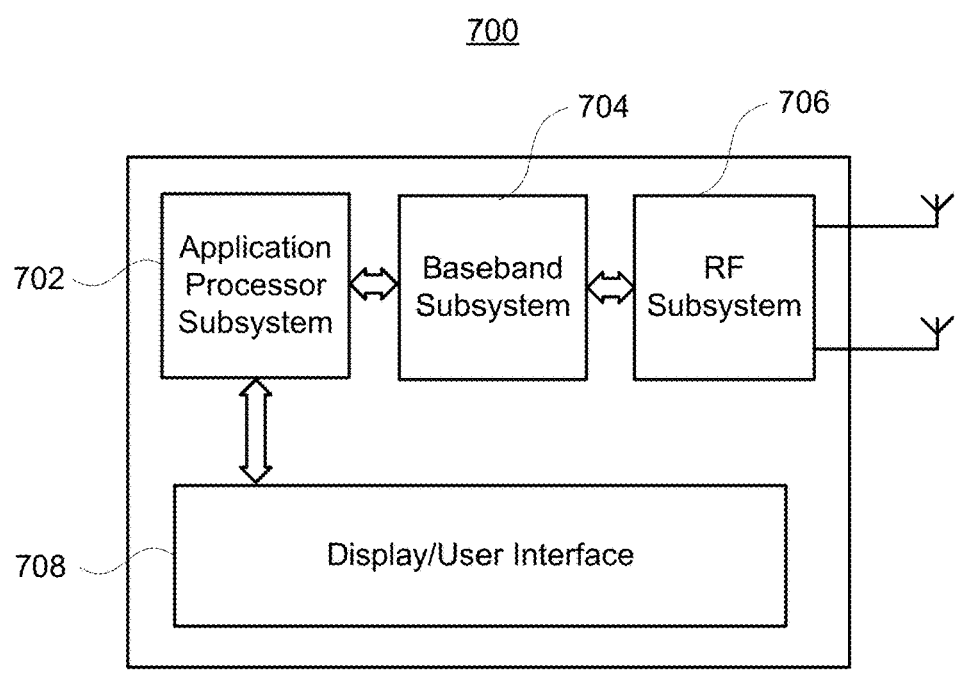
FIG. 7 illustrates a wireless mobile station diagram, which may be employed with aspects of the disclosure described herein.

As shown in FIG. 7, in one embodiment a tablet 700 may include an application processor subsystem 702, baseband subsystem 704 and a radio frequency (RF) subsystem 706 for use with a wireless communication network. A display/user interface 708 provides information to and receives input from the user. By way of example, the user interface may include one or more actuators, a speaker and a microphone. In some mobile devices, certain combination of the application processor subsystem 702, the baseband subsystem 704 and the RF subsystem 706 are all integrated as one integrated chip.

Figure 8:
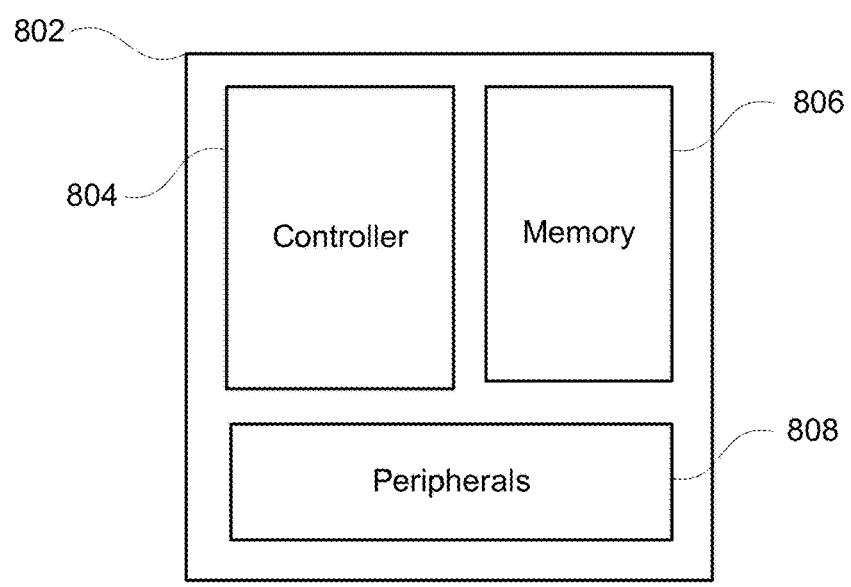
FIG. 8 illustrates an application processor subsystem for a wireless mobile station, which may be employed with aspects of the disclosure described herein.
Figure 9:
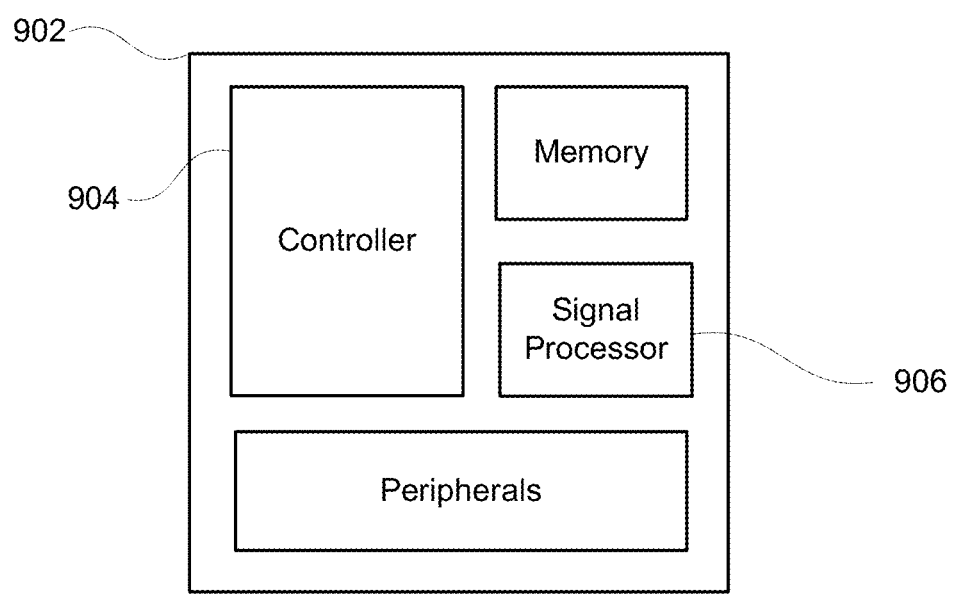
FIG. 9 illustrates a baseband subsystem for a wireless mobile station, which may be employed with aspects of the disclosure described herein.
Figure 10:
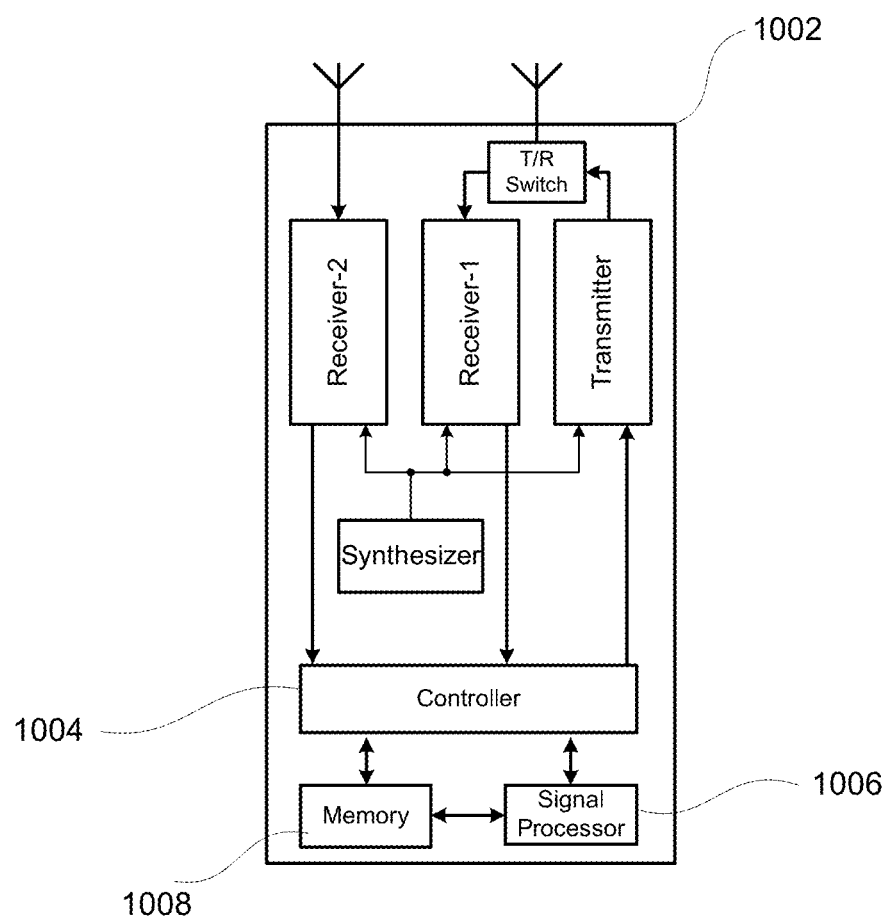
FIG. 10 illustrates a (Radio Frequency) RF subsystem for a wireless mobile station, which may be employed with aspects of the disclosure described herein.

In one embodiment, an application processor subsystem 802 as shown in FIG. 8 may include a controller 804 such as a microcontroller, another processor or other circuitry. In one embodiment a baseband subsystem 902 as shown in FIG. 9 may include a controller 904 such as a microcontroller or other processor. In one embodiment a RF subsystem 1002 as shown in FIG. 10 may include a controller 1004 such as a microcontroller, another processor or other circuitry. The application processor subsystem 702 desirably handles overall operation of the tablet 700. This may be done by any combination of hardware, software and firmware running on the application processor subsystem 702. Such a combination of hardware, software and firmware may embody any methods in accordance with aspects of the present disclosure.

Peripherals 808 such as a full or partial keyboard, video or still image display, audio interface, etc. may be employed and managed through the controller 804.

Aspects of the present disclosure may be implemented in firmware of the controller 804 of the application processor and/or the controller 904 of the baseband subsystem. In another alternative, aspects of the present disclosure may also be implemented as a combination of firmware and hardware of the application processor subsystem 702 and/or the baseband subsystem 704. For instance, a signal processing entity 906 of any or all of the FIG. 9 may be implemented in firmware, hardware and/or software. It may be part of the baseband subsystem, the receiver subsystem or be associated with both subsystems. In one example, the controller 904 and/or the signal processor 906 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smart phones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for establishing a wireless local area network (WLAN) connection between a hotspot device and a client device, in which the client device is for addition to an Authenticate List identifying at least one given client device having full network access to a Wi-Fi network provided by the hotspot device, the method comprising:

controlling, by a processing device at the hotspot device, when (i) a Wi-Fi Protected Setup (WPS) is enabled at each of the hotspot device and the client device, (ii) the hotspot device has a Wi-Fi connection with an administrative client device external to the client device over the Wi-Fi network; (iii) a hotspot configuration software (HCS) operating in the administrative client device has a socket connection with the hotspot device over the Wi-Fi network, and (iv) the client device is configured with a Service Set Identifier (SSID) and security standard of the Wi-Fi network, establishing a Wi-Fi connection with restricted network access to the Wi-Fi network between the hotspot device and the client device using the SSID and the security standard of the Wi-Fi network, in which while the Wi-Fi connection with restricted network access to the Wi-Fi network between the hotspot device and the client device is present, a process of authentication of the client device at the hotspot device based on a Media Access Control (MAC) address of the client device is not completed; and performing the process of authentication of the client device by:

transmitting, from the hotspot device to the administrative client device, via the socket connection, a connection notification message including the MAC address and device name of the client device;

receiving, at the hotspot device from the administrative client device, via the socket connection, a device authentication message responsive to the connection notification message; and when the device authentication message indicates the client device is authenticated, completing the process of authentication by (i) changing from a first Wi-Fi connection state in which the Wi-Fi connection with the restricted access to the Wi-Fi network is established between the hotspot device and the client device, to a second Wi-Fi connection state in which a Wi-Fi connection with full network access to the Wi-Fi network is established between the hotspot device and the client device and (ii) updating MAC address information for the client device at the hotspot device such that the client device is provided the full network access to the Wi-Fi network without performing the process of authentication by the hotspot device when the client device requests to join the Wi-Fi network.

2. The method of claim 1,
wherein the hotspot device is configured, and status of the hotspot device is accessible, by the HCS of the administrative client device.

3. The method of claim 1, further comprising:
controlling, by the processing device, when the device authentication message indicates the client device is not authenticated, changing from the first Wi-Fi connection state to a third Wi-Fi connection state in which a Wi-Fi connection between the hotspot device and the client device over the Wi-Fi network is absent.

4. The method of claim 1, wherein the device authentication message is based on a user operation at the administrative client device to indicate whether the client device is authenticated.

5. The method of claim 4, wherein the user operation is to a display caused to be displayed by the HCS and indicating the connection request with the name and the MAC address of the client device.

6. The method of claim 5, wherein the user operation is to a portion on the display for indicating whether the client device is to be authenticated.

7. The method of claim 1, further comprising:
controlling, by the processing device,
adding the MAC address to a Block List, when the device authentication message indicates the client device is not authenticated, and
adding the MAC address to the Authenticate List, when the device authentication message indicates the client device is authenticated.

8. The method of claim 1, further comprising:
controlling, by the processing device, transmitting a device authentication response message from the hotspot device to the administrative client device, via the socket connection, after the updating of the MAC address information.

9. The method of claim 1, wherein the hotspot device is a non-portable hotspot device configured to use internet broadband service to provide wireless internet access over the Wi-Fi network at a same time to a plurality of client devices.

10. The method of claim 1,
wherein, when the hotspot device is a non-mobile hotspot or provisioning of the hotspot device as a mobile hotspot device is not controlled by a mobile broadband network, a second client device having a Wi-Fi connection established with the hotspot device over the Wi-Fi network is manually authenticatable to serve as the administrative client device.

11. An apparatus for establishing a wireless local area network (WLAN) connection between a hotspot device and a client device, in which the client device is for addition to an Authenticate List identifying at least one given client device having full network access to a Wi-Fi network provided by the hotspot device, the apparatus being at the hotspot device and comprising:

circuitry configured to control, when (i) a Wi-Fi Protected Setup (WPS) is enabled at each of the hotspot device and the client device, (ii) the hotspot device has a Wi-Fi connection with an administrative client device external to the client device over the Wi-Fi network; (iii) a hotspot configuration software (HCS) operating in the administrative client device has a socket connection with the hotspot device over the Wi-Fi network, and (iv) the client device is configured with a Service Set Identifier (SSID) and security standard of the Wi-Fi network, establishing a Wi-Fi connection with restricted network access to the Wi-Fi network between the hotspot device and the client device using the SSID and the security standard of the Wi-Fi network, in which while the Wi-Fi connection with restricted network access to the Wi-Fi network between the hotspot device and the client device is present, a process of authentication of the client device at the hotspot device based on a Media Access Control (MAC) address of the client device is not completed; and performing the process of authentication of the client device by:

transmitting, from the hotspot device to the administrative client device, via the socket connection, a connection notification message including the MAC address and device name of the client device;

receiving, at the hotspot device from the administrative client device, via the socket connection, a device authentication message responsive to the connection notification message; and when the device authentication message indicates the client device is authenticated, completing the process of authentication by (i) changing from a first Wi-Fi connection state in which the Wi-Fi connection with the restricted access to the Wi-Fi network is established between the hotspot device and the client device, to a second Wi-Fi connection state in which a Wi-Fi connection with full network access to the Wi-Fi network is established between the hotspot device and the client device and (ii) updating MAC address information for the client device at the hotspot device such that the client device is provided the full network access to the Wi-Fi network without performing the process of authentication by the hotspot device when the client device requests to join the Wi-Fi network.

12. The apparatus of claim 11,
wherein the hotspot device is configured, and status of the hotspot device is accessible, by the HCS of the administrative client device.

13. The apparatus of claim 11,
wherein the circuitry is configured to control, when the device authentication message indicates the client device is not authenticated, changing from the first Wi-Fi connection state to a third Wi-Fi connection state in which a Wi-Fi connection between the hotspot device and the client device over the Wi-Fi network is absent.

14. The apparatus of claim 11, wherein the device authentication message is based on a user operation at the administrative client device to indicate whether the client device is authenticated.

15. The apparatus of claim 11,
wherein the circuitry is configured to control:
adding the MAC address to a Block List, when the device authentication message indicates the client device is not authenticated, and
adding the MAC address to the Authenticate List, when the device authentication message indicates the client device is authenticated.

16. The apparatus of claim 11,
wherein the circuitry is configured to control transmitting a device authentication response message from the hotspot device to the administrative client device, via the socket connection, after the updating of the MAC address information.

17. A wireless communication device comprising:
a receiver for receiving a signal; and
a processing device for establishing a wireless local area network (WLAN) connection between the wireless communication device as a hotspot device and a client device, in which the client device is for addition to an Authenticate List identifying at least one given client device having full network access to a Wi-Fi network provided by the hotspot device,
wherein the processing device is configured to control, when (i) a Wi-Fi Protected Setup (WPS) is enabled at each of the hotspot device and the client device, (ii) the hotspot device has a Wi-Fi connection with an administrative client device external to the client device over the Wi-Fi network; (iii) a hotspot configuration software (HCS) operating in the administrative client device has a socket connection with the hotspot device over the Wi-Fi network, and (iv) the client device is configured with a Service Set Identifier (SSID) and security standard of the Wi-Fi network,
establishing a Wi-Fi connection with restricted network access to the Wi-Fi network between the hotspot device and the client device using the SSID and the security standard of the Wi-Fi network, in which while the Wi-Fi connection with restricted network access to the Wi-Fi network between the hotspot device and the client device is present, a process of authentication of the client device at the hotspot device based on a Media Access Control (MAC) address of the client device is not completed; and
performing the process of authentication of the client device by:
transmitting, from the hotspot device to the administrative client device, via the socket connection, a connection notification message including the MAC address and device name of the client device;
receiving, at the hotspot device from the administrative client device, via the socket connection, a device authentication message responsive to the connection notification message; and
when the device authentication message indicates the client device is authenticated, completing the process of authentication by (i) changing from a first Wi-Fi connection state in which the Wi-Fi connection with the restricted access to the Wi-Fi network is established between the hotspot device and the client device, to a second Wi-Fi connection state in which a Wi-Fi connection with full network access to the Wi-Fi network is established between the hotspot device and the client device and (ii) updating MAC address information for the client device at the hotspot device such that the client device is provided the full network access to the Wi-Fi network without performing the process of authentication by the hotspot device when the client device requests to join the Wi-Fi network.

* * * * *